United States Patent
McCall et al.

(10) Patent No.: US 8,150,781 B2
(45) Date of Patent: Apr. 3, 2012

(54) PACKAGE SHIPPING SYSTEM AND METHOD, INCLUDING USAGE OF HISTORICAL ANALYTIC DATA

(75) Inventors: Keith A. McCall, Sammamish, WA (US); Meagan R. Zeman, Seattle, WA (US)

(73) Assignee: Enroute Systems Corporation, Bellevue, WA (US)

( * ) Notice: Subject to any disclaimer, the term of this patent is extended or adjusted under 35 U.S.C. 154(b) by 0 days.

(21) Appl. No.: 12/885,254

(22) Filed: Sep. 17, 2010

(65) Prior Publication Data

US 2011/0071954 A1    Mar. 24, 2011

Related U.S. Application Data

(60) Provisional application No. 61/243,924, filed on Sep. 18, 2009.

(51) Int. Cl.
*G06Q 30/00* (2012.01)
(52) U.S. Cl. ......... 705/334; 705/330; 705/336; 705/338
(58) Field of Classification Search ................ 705/33 X, 705/7, 61
See application file for complete search history.

(56) References Cited

U.S. PATENT DOCUMENTS

| | | | |
|---|---|---|---|
| 5,699,258 A | 12/1997 | Thiel | |
| 6,035,291 A | 3/2000 | Thiel | |
| 6,571,213 B1 * | 5/2003 | Altendahl et al. | 705/330 |
| 6,957,197 B1 * | 10/2005 | Altendahl et al. | 705/61 |
| 7,117,170 B1 | 10/2006 | Bennett et al. | |
| 7,496,520 B1 | 2/2009 | Handel et al. | |
| 7,647,233 B2 | 1/2010 | Kadaba et al. | |
| 7,660,721 B2 | 2/2010 | Williams et al. | |
| 7,664,651 B1 | 2/2010 | Bennett et al. | |
| 7,827,118 B1 * | 11/2010 | Smith et al. | 705/333 |
| 8,078,293 B2 * | 12/2011 | Campagna et al. | 700/32 |
| 2001/0034608 A1 * | 10/2001 | Gendreau | 705/1 |

(Continued)

FOREIGN PATENT DOCUMENTS

KR        100349607 B1      8/2002

OTHER PUBLICATIONS

"Enroutes online service aims to cut shipping costs," by John Fontana, published by Network World on Apr. 17, 2009, pp. 2-3 of 1-3.*

(Continued)

*Primary Examiner* — John Hayes
*Assistant Examiner* — Brian Epstein
(74) *Attorney, Agent, or Firm* — Schwabe, Williamson & Wyatt, P.C.

(57) ABSTRACT

Embodiments provide methods, apparatus, systems, and computer-readable media associated with using historic analytic data to identify shipping options for a user to use when shipping a package. Historic analytic data may be received and maintained by a package shipment facilitation system. The analytics may then be used to generate business rules which may be applied to parameters for a package that is to be shipped. Through application of the business rules, one or more preferred shipping options may be identified. Business rules may be received after being manually-generated by a user, or may be automatically generated based at least in part on the maintained historic analytics. After a shipping option is chosen for the package, a shipping label may be printed for the package, and the package may be entered into a carrier's system for processing.

15 Claims, 10 Drawing Sheets

U.S. PATENT DOCUMENTS

| | | | |
|---|---|---|---|
| 2002/0032573 A1* | 3/2002 | Williams et al. | 705/1 |
| 2002/0082880 A1 | 6/2002 | Salloum | |
| 2002/0095347 A1* | 7/2002 | Cummiskey | 705/26 |
| 2003/0046133 A1* | 3/2003 | Morley et al. | 705/8 |
| 2003/0050810 A1* | 3/2003 | Larkin | 705/7 |
| 2003/0200111 A1 | 10/2003 | Damji | |
| 2004/0059636 A1* | 3/2004 | McClung et al. | 705/26 |
| 2004/0133438 A1* | 7/2004 | Zeisset et al. | 705/1 |
| 2005/0038758 A1 | 2/2005 | Hilbush et al. | |
| 2005/0071247 A1* | 3/2005 | Kelley et al. | 705/26 |
| 2005/0137923 A1* | 6/2005 | Mosbrucker | 705/8 |
| 2005/0209913 A1* | 9/2005 | Wied et al. | 705/12 |
| 2006/0224398 A1* | 10/2006 | Lakshman et al. | 705/1 |
| 2006/0273574 A1* | 12/2006 | Herzog | 283/74 |
| 2007/0073551 A1* | 3/2007 | Williams et al. | 705/1 |
| 2007/0198279 A1* | 8/2007 | Hallas et al. | 705/1 |
| 2008/0162304 A1* | 7/2008 | Ourega | 705/27 |
| 2008/0288368 A1* | 11/2008 | Marks et al. | 705/27 |
| 2009/0037095 A1* | 2/2009 | Jani et al. | 701/202 |

OTHER PUBLICATIONS

"Oracle Transportation Users Guide, Release 11" by Oracle, published May 2003, pp. 1-5 through end.*

International Search Report and Written Opinion for PCT/US2010/049382, mailed May 20, 2011.

* cited by examiner

PACKAGE SHIPPING SYSTEM AND METHOD, INCLUDING USAGE OF HISTORICAL ANALYTIC DATA

BACKGROUND

With the advance of the Internet and ecommerce, businesses and individuals increasingly utilize carriers to ship packages they produce. Businesses and individuals may ship numerous packages each day, and may ship these packages to different destinations or under different constraints. For example, businesses and individuals may need to: ship packages overnight or by a specific time, ship to international destinations, ship via ground transportation (such as for dangerous materials), require signature at delivery, ship to difficult or untested destination addresses, ship refrigerated or hazardous materials, and other requirements.

Numerous shipping options exist for these businesses and/or individuals to utilize for shipping their packages. Businesses and individuals may choose from numerous regionally- or nationally-based package and letter carriers. These individual carriers offer varying rates of service based on destination, material, transportation requirements, and time requirements. With all of these competing options, it can be difficult for a business (more specifically, an employee of the business) or an individual to choose a shipping option which best or close to best supports a particular or a group of shipping needs.

In existing systems, users are merely able to poll carriers to determine proposed shipping costs and proposed time-in-transit for a package. Beyond that, these systems seldom provide users with additional useful information for the user to determine the "best" shipping option. A user, knowing only the proposed cost of a particular shipping option, may be unsure about whether additional, unposted costs may present themselves during shipment. For example, if a package is not delivered on time or in the right condition (e.g., melted, damaged), the carrier may be forced to refund money to the package's recipient. In another example, a particular destination may present challenges, such as tacked-on carrier surcharges for recipients who are frequently not at home or difficult to find. These costs may not be adequately represented in a carrier's posted fees to aid the user in carefully choosing the carrier for their packages.

DETAILED DESCRIPTION

Figure 1:
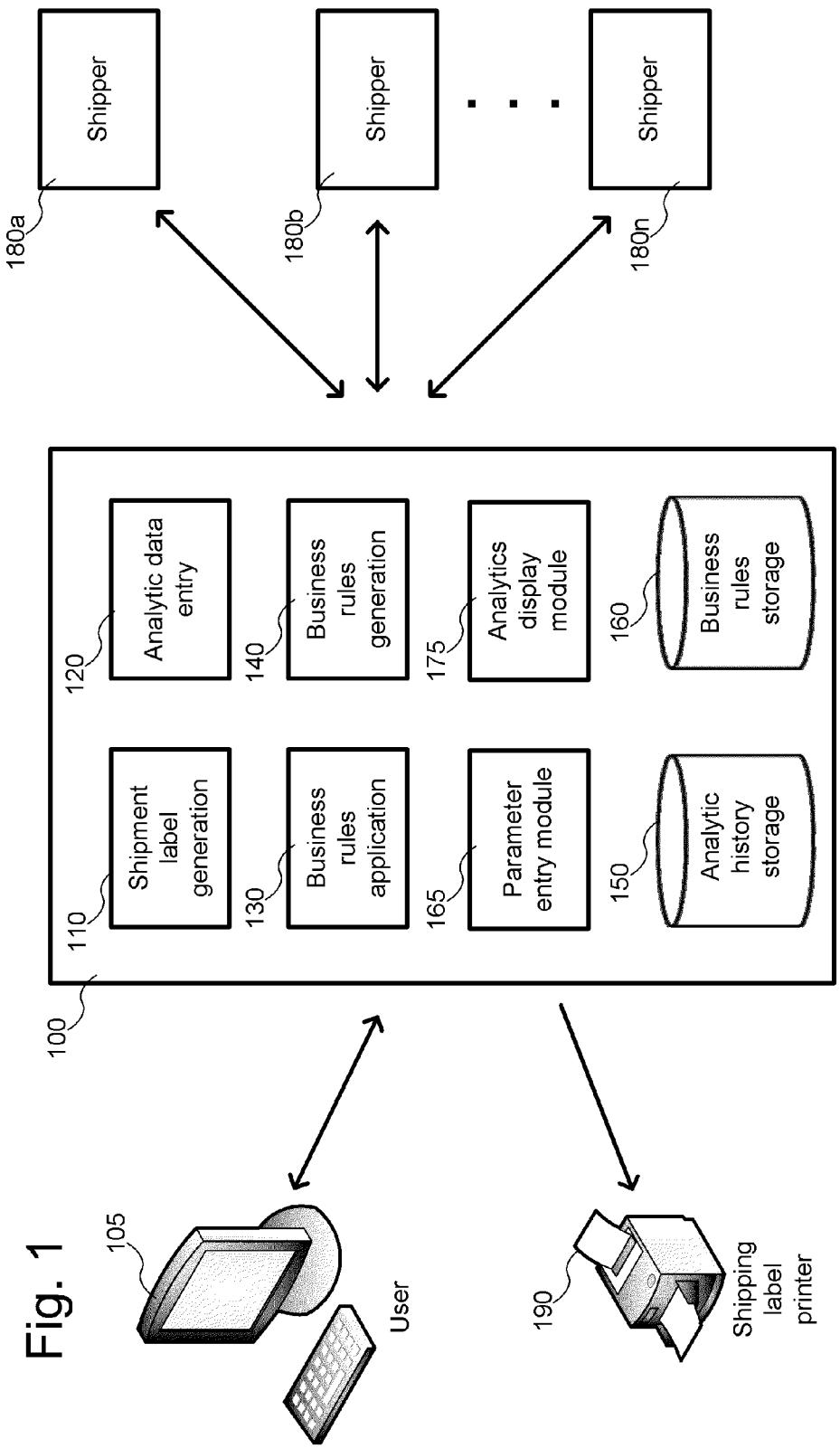
FIG. 1 illustrates a block diagram of selected components of a package shipment facilitation system using historic analytical data.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein.

The herein described subject matter sometimes illustrates different components or elements contained within, or connected with, different other components or elements. It is to be understood that such depicted architectures are merely examples, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically mateable and/or physically interacting components and/or wirelessly interactable and/or wirelessly interacting components and/or logically interacting and/or logically interactable components.

Various aspects of the subject matter described herein are described using terms commonly employed by those skilled in the art to convey the substance of their work to others skilled in the art. However, it should be apparent to those skilled in the art that alternate implementations may be practiced with only some of the described aspects. For purposes of explanation, specific numbers, materials, and configurations are set forth in order to provide a thorough understanding of the illustrative examples. However, it should be apparent to one skilled in the art that alternate embodiments may be practiced without the specific details. In other instances, well-known features are omitted or simplified in order not to obscure the illustrative embodiments.

With respect to the use of substantially any plural and/or singular terms herein, those having skill in the art may translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to inventions containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and e, etc." is used, in general such a construction is intended in the sense one having skill in the art would understand the convention (e.g., "a system having at least one of A, B, and C" would include but not be limited to systems that have A alone, B alone, C alone, A and B together, A and e together, B and e together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

Various operations may be described as multiple discrete operations in turn, in a manner that may be helpful in understanding embodiments; however, the order of description should not be construed to imply that these operations are order dependent. Also, embodiments may have fewer operations than described. A description of multiple discrete operations should not be construed to imply that all operations are necessary. Also, embodiments may have fewer operations than described. A description of multiple discrete operations should not be construed to imply that all operations are necessary.

The disclosure is drawn, inter alia, to techniques, methods, apparatuses, systems, articles of manufacture, and computer-readable media related to facilitating shipping of packages using historic analytical shipping data.

Described embodiments include techniques, methods, apparatuses, systems, articles of manufacture, and non-transitory tangible computer-readable media which may be associated with using shipping business rules which may identify shipping options for a business or other user to use when shipping a package. In various embodiments, historic analytic data (or "analytics") may be received and maintained by a package shipment facilitation system. In some embodiments, these analytics may be received for the particular location of a business, or for selected or all locations of a business; in some embodiments, the analytics may be received for multiple businesses. The analytics may then be used, in various embodiments, to generate business rules for a location of a business or for selected or all locations of a business. These business rules may be applied to parameters for a package that is to be shipped. Through application of the business rules, one or more preferred shipping options may be identified. In various embodiments, business rules may be received after being manually-generated by a user. In various embodiments, the business rules may be received and/or generated based at least in part on the stored historic analytics. After a shipping option is chosen for the package, a shipping label may be printed for the package, and the package may be entered into a carrier's system for processing.

Through the use of historic analytics, potential savings can be identified. In various embodiments, these savings may include improved efficiency, reduced costs, and enhanced quality and security of package and freight delivery. Through the use of these analytics and identification of shipping options, benefits to the business may be obtained other than those directly represented by a carrier's posted cost.

FIG. 1 illustrates a block diagram of selected components of a package shipment facilitation system 100 according to various embodiments. In the illustrated example, the package shipment facilitation system 100 communicates with a user 105 (typically of a business) to facilitate the user in shipping packages (for the business). In various embodiments, the illustrated user 105 may be a user at a business, an individual acting on their own behalf, or may represent multiple users which act on behalf of a business. In various embodiments, the user 105 may interact with the package shipment facilitation system 100 though a computer-based interface. For example, in one embodiment, the user may interact with the package shipment facilitation system 100 through a dedicated application which communicates with the package shipment facilitation system 100, such as an application executing on the user's computer. In another embodiment, the user interacts with the package shipment facilitation system 100 through a web-based interface, such as through a web page or through a toolbar installed on a web-browser. In other embodiments, other users may also interact with the package shipment facilitation system 100 in various embodiments, either at the same business or at other sites. These users are not illustrated in FIG. 1 for the sake of clear illustration.

In various embodiments, the package shipment facilitation system 100 may also interact with one or more carriers, illustrated in FIG. 1 as carriers 180a-180n. In various embodiments, these carriers 180a-180n may comprise local, regional, and/or nationally-based shipping companies. In various embodiments, the package shipment facilitation system 100 may interact with the carriers 180a-180n through known techniques, such as through application programming interfaces provided by one or more of the carriers 180a-180n. In other embodiments, the package shipment facilitation system 100 may communicate with the carriers 180a-180n through web or other telecommunications interfaces. In various embodiments, the package shipment facilitation system 100 communicates with the carriers 180a-180n to acquire information about shipping options, including transportation options offered by carriers (e.g., ground or air), time frames for shipments, insurance options, etc. In various embodiments, tracking, price, and/or cost information may also be obtained by the package shipment facilitation system 100 from the carriers 180a-180n. In this way, historical shipping analytic data may be obtained from the carriers 180a-180n in order to facilitate package shipping, as described herein. In other embodiments, the package shipment facilitation system 100 may communicate with the carriers 180a-180n to send package information and begin shipments.

In various embodiments, the package shipment facilitation system 100 may comprise one or more modules, such as software, hardware, and/or firmware modules to perform various shipping facilitation operations for the package shipment facilitation system 100. In various embodiments, the modules may interact with the user 105 and/or with carriers 180a-180n.

For example, in various embodiments, the package shipment facilitation system 100 may comprise an analytic data entry module 120. In various embodiments, the analytic data entry module 120 may provide for one or more users to input historic analytic data about past shipments. In another embodiment, the analytic data entry module 120 may be configured to request and receive historic analytic data from the carriers 180a-180n. In various embodiments the analytic data entry module, after receiving the historic analytic data, may store the historic analytic data in the analytic history storage 150. In various embodiments, the analytic history storage 150 may comprise various storage devices and/or software storage modules, including, for example, a database and one or more hard drive and/or solid-state storage devices. In various embodiments, the historic analytic data may be displayed to a user using the illustrated analytics display module 175.

In various embodiments, the package shipment facilitation system 100 also comprises a business rules storage 160, which stores one or more business rules. In various embodiments, the business rules stored in the business rules storage 160 may be applied to parameters for a package to be shipped in order to identify one or more preferred shipping options which may be used for that package. The business rules application module 130 may be used, in various embodiments, to perform application of one or more of the business rules to the parameters to identify the one or more preferred shipping options. Various embodiments of the parameters for a package may include, for example, destination address, time frame, delivery time, and/or transportation type. In various embodiments, the parameters for a package may be entered by the user through an interface facilitated by the illustrated parameter entry module 165.

As will be described below, in various embodiments, the business rules may be received directly from the user, such as by the user creating one or more business rules manually using the business rules generation module 140. In other embodiments, the business rules generation module 140 may automatically generate one or more business rules, as will be described herein. In various embodiments, the business rules generation module 140 may also allow the user to prioritize and/or edit previously-entered business rules.

After identification of one or more preferred shipping options, the package shipment facilitation system 100 may, through its shipment label generation module 110, generate one or more shipping labels for a package. This shipping label may, in some embodiments, be printed on a shipping label printer 190, such as a printer attached to a computer of the user 105.

Figure 2:
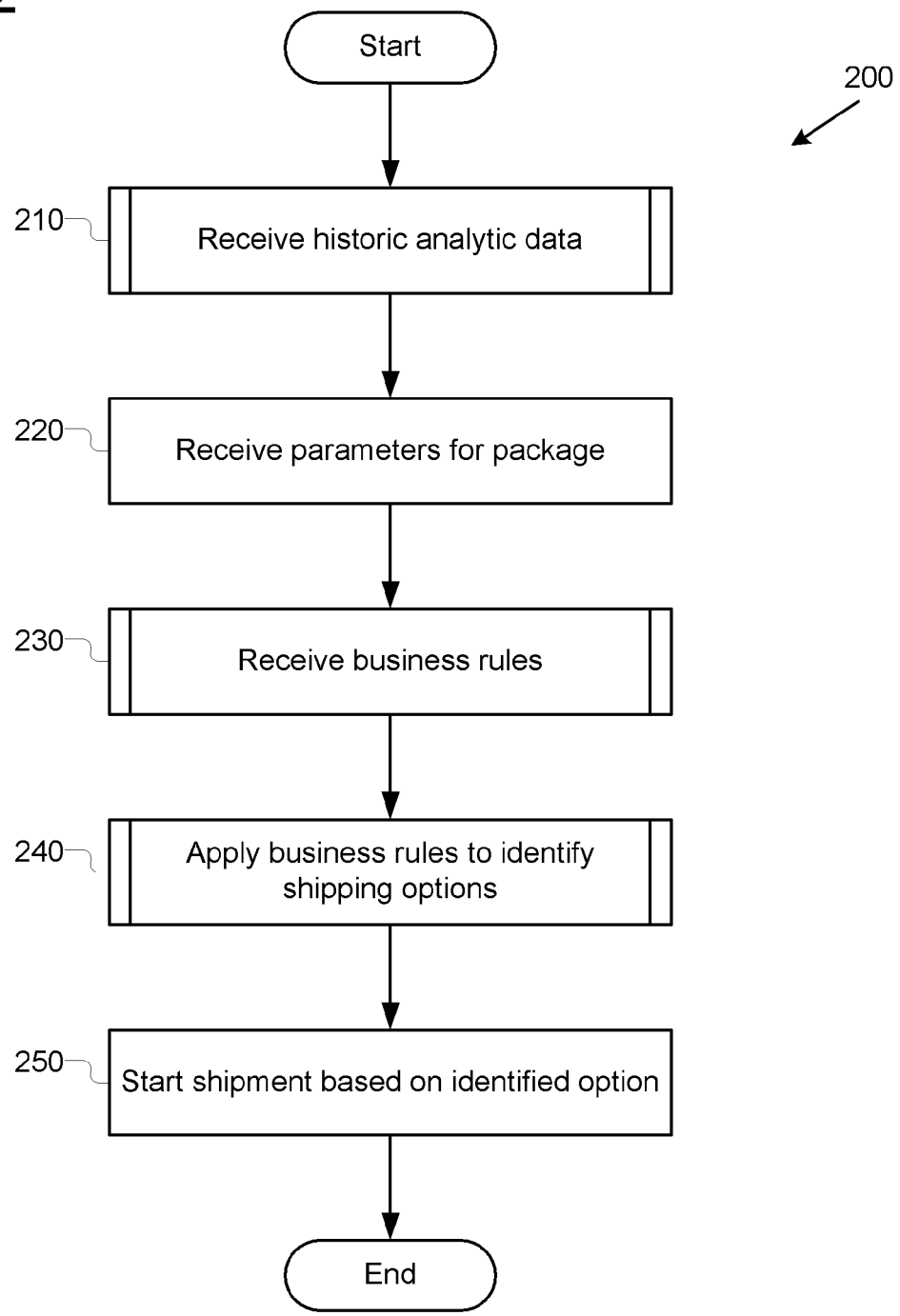
FIG. 2 illustrates a process for shipping a package using historic analytical data.

FIG. 2 illustrates an example process 200 for the package shipment facilitation system 100 to facilitate shipping a package using historic analytical data. In various embodiments, the operations illustrated in process 200 may be combined, split into multiple separate operations, or omitted entirely. The process may begin at operation 210, where the package shipment facilitation system 100 may receive historic analytic data regarding past shipments which have been made by the user or by other users and/or businesses. In one embodiment, operation 210 is performed by analytic data entry module 120. Particular details of operation 210 are described below. Next, at operation 220, the package shipment facilitation system 100 may receive parameters for a package. In one embodiment, the data may be received from a user shipping the package. As discussed herein, in various embodiments, the parameters may include data such as, but not limited to, destination, time frame for shipment, insurance, whether the package should be signed for upon receipt, insurance, preferred cost, etc.

At operation 230, the package shipment facilitation system 100 may receive business rules. In various embodiments, these business rules may be particular to the user (or a location of a business) shipping the package, and/or may be generated or received based on other users (and/or other locations of the business and/or other businesses), or dynamically by data mining and extraction techniques on existing data. In various embodiments operation 230 may be performed in whole or in part, by the business rules generation module 140. In various embodiments, business rules may be received prior to receiving either analytic data or parameters for a particular package. Particular details of operation 230 are described below.

At operation 240, the package shipment facilitation system 100 may apply the received business rules to the parameters received at operation 220 to identify one or more preferred shipping options. In various embodiments, the application may be performed through operation of the business rules application module 130. Particular details of operation 240 are described below. At operation 250, the package shipment facilitation system 100 may start a shipment of the package based on one of the identified shipping options. In various embodiments, the package shipment facilitation system 100 may print out a shipping label for the user, send package information to a carrier, and/or begin financial transactions to start the shipment. The process may then end.

Figure 3:
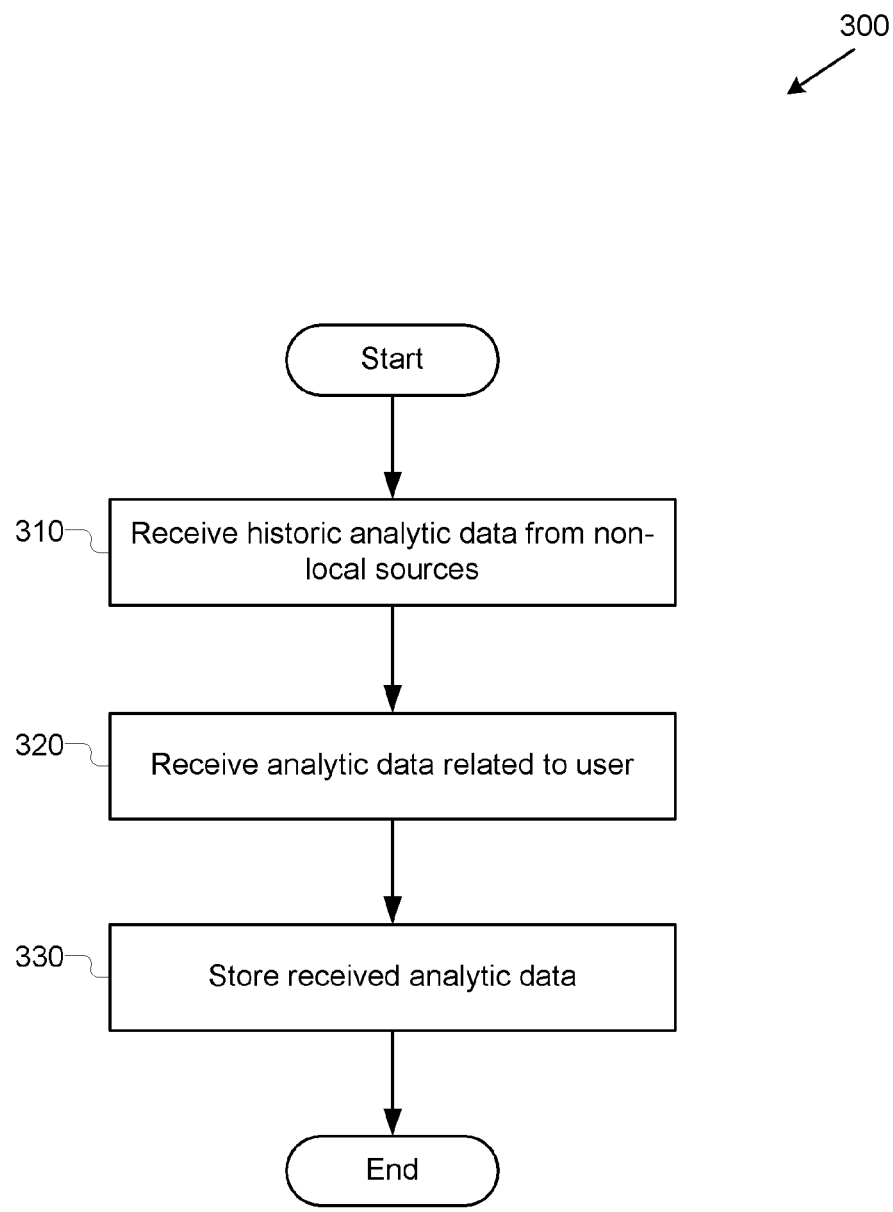
FIG. 3 illustrates a process for receiving historic analytical shipping data.

FIG. 3 illustrates an example process 300 for the analytic data entry module 120 of the package shipment facilitation system 100 to receive historic analytic data. In some embodiments, process 300 may be performed in one or more implementations of operation 210 of FIG. 2. In various embodiments, the operations illustrated in process 300 may be combined, split into multiple separate operations, or omitted entirely. The process may begin at operation 310, where the analytic data entry module 120 may receive historic analytic data from non-local sources. In one embodiment, the analytic data entry module 120 may receive historic analytic data from carriers, such as carriers 180a-180n. In another embodiment, the analytic data entry module 120 may receive historic analytic data from multiple users, such as users representing various businesses. In various embodiments, this data may be empirical data. By aggregating this historic data, business rules may be created which are more robust and which offer better efficiencies to users than if the business rules were created entirely from locally-obtained analytic data. At operation 320, the analytic data entry module 120 may receive analytic data related to the user (or the user's business). In one embodiment, this may comprise receiving manually-entered data about past shipments the user or business has made. In another embodiment, the user may obtain shipping records, such as from carriers 180a-180n, and input these into the analytic data entry module 120. In other embodiments, historic analytic data related to the user or the user's business may be entered into the analytic data entry module 120 via other methods. At operation 330, the analytic data entry module 120 may store the received historic analytic data, such as by generating or updating a database in the analytic history storage 150. The process may then end.

Figure 4:
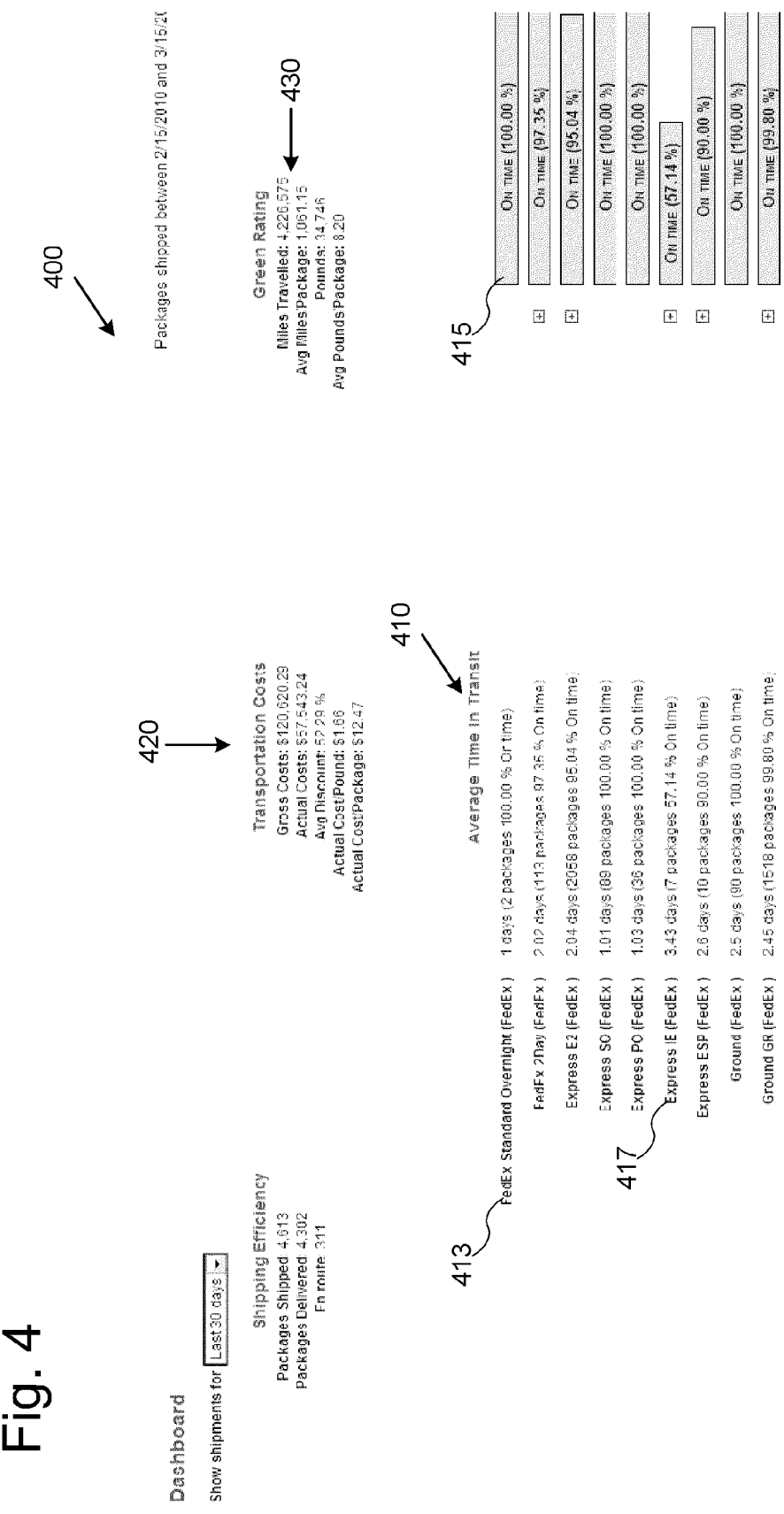
FIG. 4 illustrates an example of a display showing historic analytical shipping data.

FIG. 4 illustrates an example of a display 400 showing historic analytical shipping data. The display may be presented to a user for review to generate business rules, or simply to review historical trends. In various embodiments, the display is generated by the analytics display module 175, such as by generating a web page or by sending information to software operating on the computer of the user 105. In the embodiment illustrated, historic analytics are based on a particular user's personal shipping history for a time period between Feb. 15, 2010 and Mar. 15, 2010. In the example, historic analytic data about shipping times is displayed under listing 410, titled "Average time in transit." Example analytic 413 shows that, for this measured time period, FedEx Standard Overnight has had an average transit time of 1 day for two packages. Furthermore, this represents a 100% on-time rate compared to expected to transit times. The display also shows a graphical representation of the on-time rate at example 415. By contrast, example analytic 417 shows that for this user using the Express IE shipping option during the measured time period, the user experienced, a 3.43 day average transit time for 7 packages. The example also shows that only 57.14% of these packages were on time. In other examples, aggregate analytics may be displayed for a user by the analytics display module 175, such as the aggregate transportation costs information 420 or the aggregate green ratings 430. In various embodiments, historic analytic data such as those displayed, including nominal prices, costs, unanticipated surcharges, time, and green-rating data, may be used to generate business rules, as described below.

Figure 5:
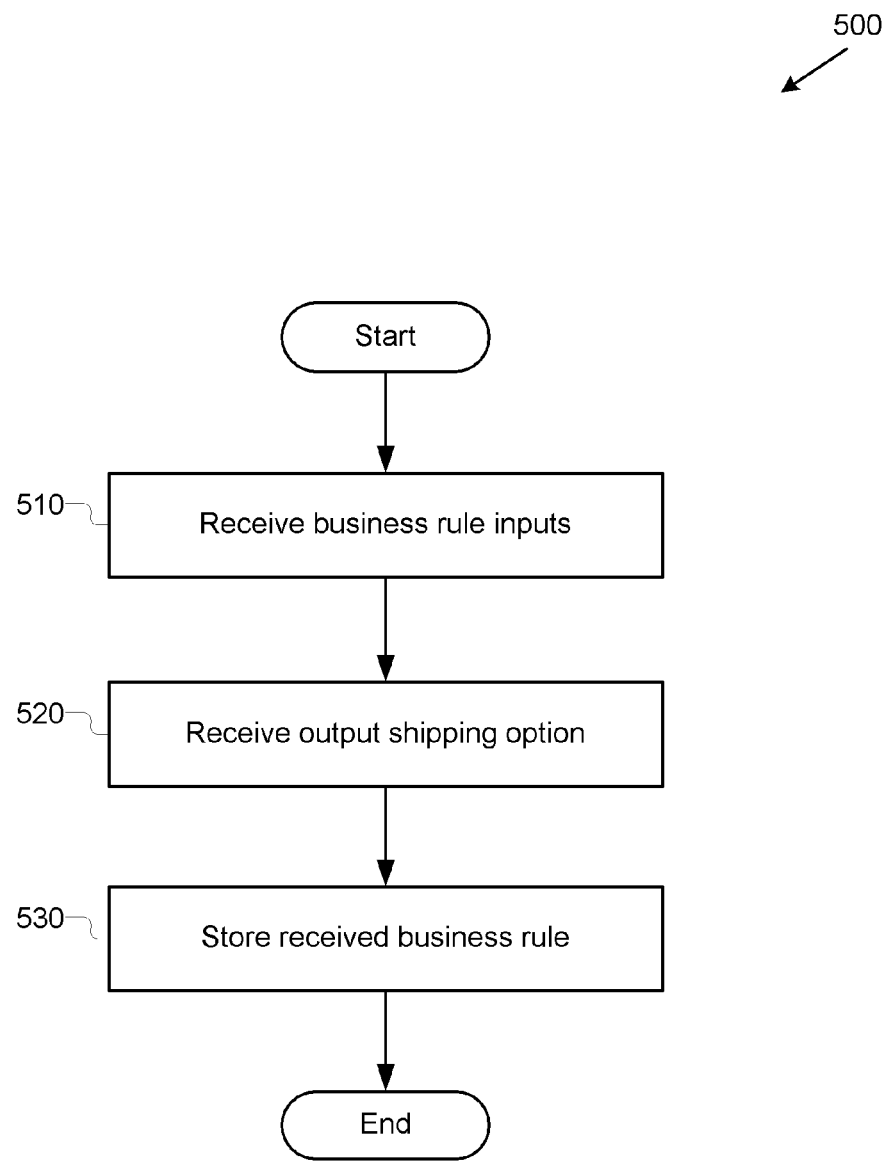
FIG. 5 illustrates a process for receiving a business rule to use when choosing a shipping option.

FIG. 5 illustrates an example process 500 for the business rules generation module 140 of the package shipment facilitation system 100 to receive a business rule. Process 500 may be performed in one or more implementations of operation 230 of FIG. 2 to receive manually-created business rules from a user. The process may begin at operation 510, where the business rules generation module 140 may receive business rule inputs. In various embodiments, business rule inputs may comprise, for example, destination information, package information, time frame requirements, and/or other package information. At operation 520, the business rules generation module 140 may receive an output shipping option which is to be applied to a package that satisfies the business rule inputs. In various embodiments, an indication for how many inputs are required for application of the business rule may be received. For example, in various embodiments, a received business rule may indicate that, if one of a set of business rule inputs is true, a particular output shipping option should be selected. In another embodiment, a received business rule may indicate that, only if every input out of a set of business rule inputs is true, then a particular output shipping option should be selected. At operation 530, the business rules generation module 140 may store the received business rule. In one embodiment, the business rules generation module 140 may store the received business rule by storing the rule in a business rules database in the business rules storage 160. The process may then end.

Figure 6:
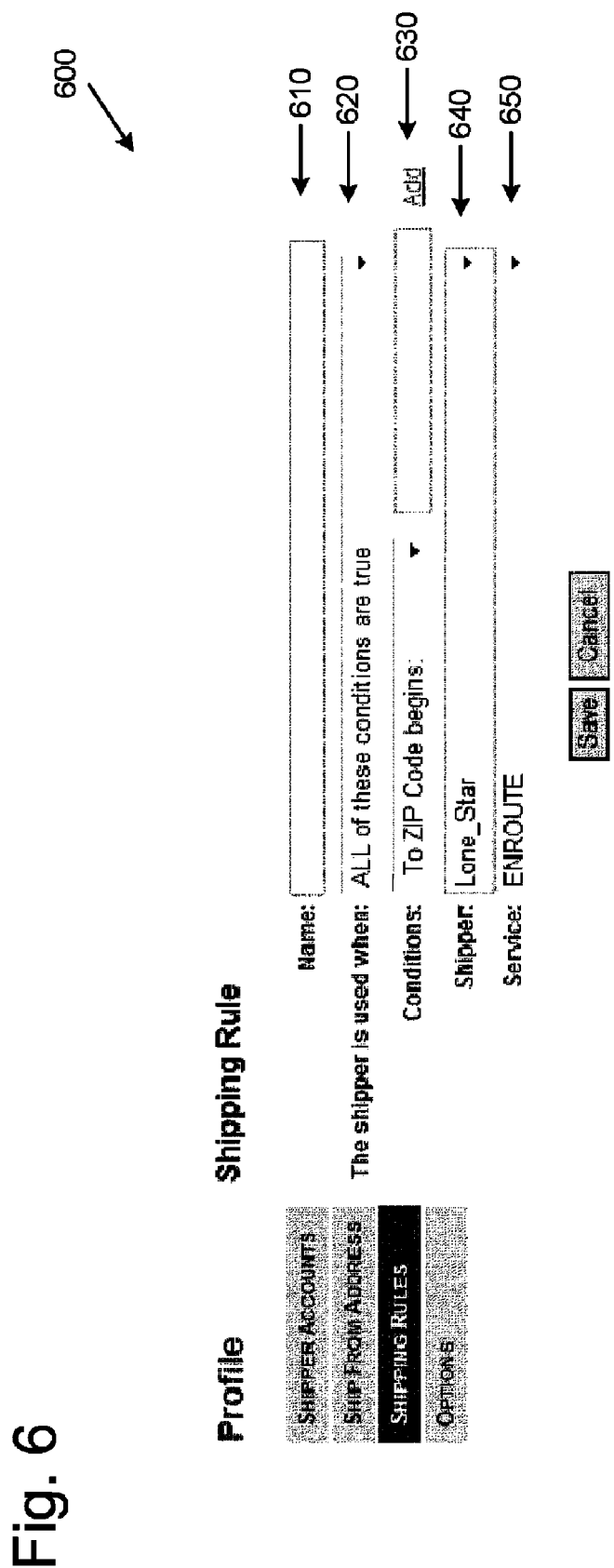
FIG. 6 illustrates an example of an interface for receiving a business rule.

FIG. 6 illustrates an example of a display 600 showing one implementation of an interface for a user to manually enter business rules, such as by using the process of FIG. 5. In various embodiments, the interface in the display 600 may be provided to a user by the business rules generation module 140. At entry box 610, the user 105 may enter a name so that the business rule may be identified. At selection 620, the user may indicate whether the business rule should require that every or just one business rule input should be satisfied for the business rule to apply. Then, at entry 630, a business rule input may be input, illustrated in FIG. 6 as a "condition." In the illustrated example, the user may enter a destination zip code as a business rule input. Additionally, the user 105 may click on an "Add" link to add additional business rule inputs. The example also shows a selection 640 for a carrier, which represents the output shipping option which is indicated when a proper number of business rule inputs are reached during rule application. Finally, the example shows a selection 650 for a service to use with the carrier. Examples of services include next day, second day, ground, etc. In various embodiments, the services which are available for selection may depend on the carrier selection.

Figure 7:
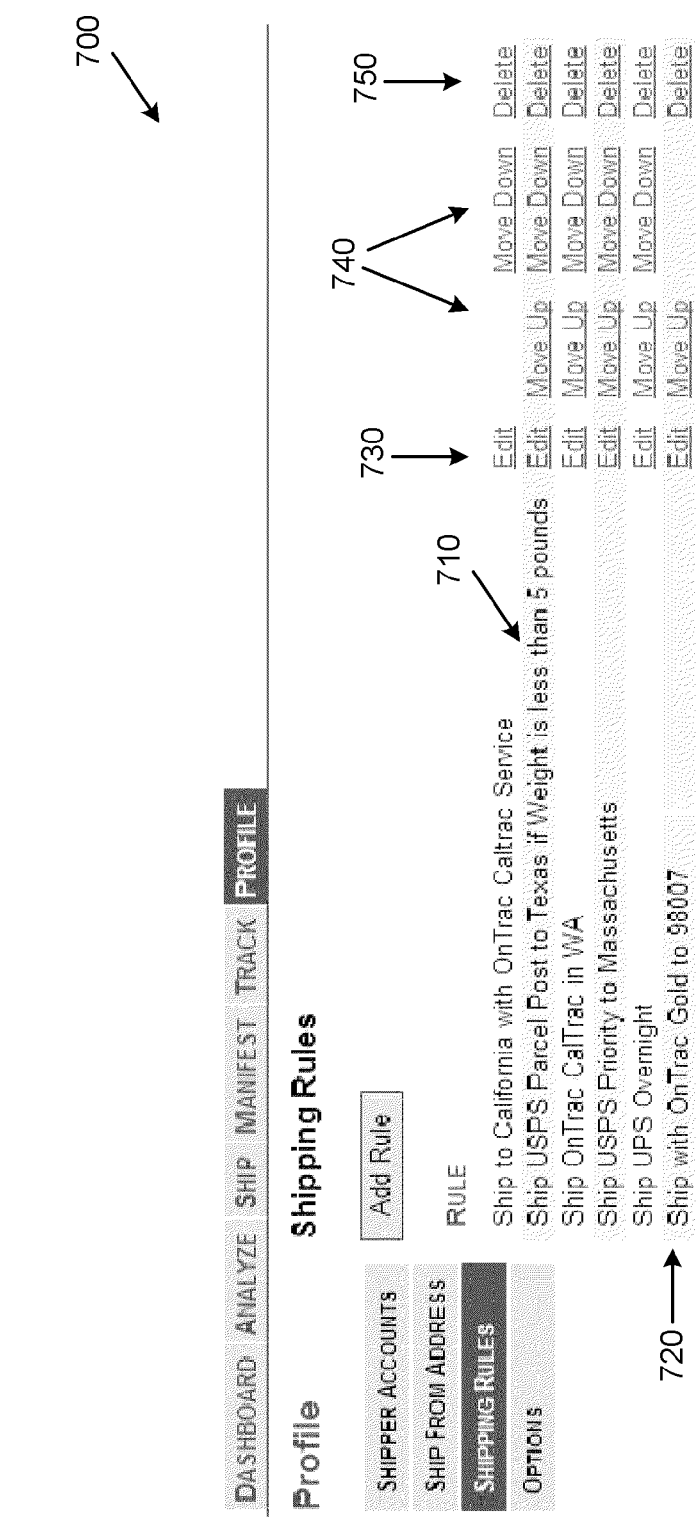
FIG. 7 illustrates an example of a display showing multiple shipping business rules.

FIG. 7 illustrates an example of a display 700 showing one implementation of an interface for a user to review one or more business rules, as well as for editing and/or prioritizing the one or more business rules. In various embodiments, the interface in the display 700 may be provided to a user by the business rules generation module 140. As FIG. 7 illustrates, the display 700 may show more than one business rules, such as business rule example 710. In example 710, the exemplified business rule is applied to packages which: a) are to be sent to Texas, and b) weigh less than 5 pounds. In the business rule of example 710, when both of these inputs are satisfied, the business rule is applied to indicate that the package should be shipped via USPS Parcel Post. In the business rule of example 720, the rule indicates that OnTrac Gold is the preferred shipping option for packages which are to be sent to zip code 98007. The display also shows example action items 730, which allow a user to edit any of the previously-generated business rules, and example items 750, which allow the rules to be selectively deleted. Also, by selecting action items 740, the user 105 may move rules up or down in the list of business rules. In various embodiments, business rules may be ordered so that a user can establish precedence of one rule over another. Thus, in the example shown, the system will identify that a package sent to Washington should be shipped using OnTrac CalTrac even if that package is going to 98007. The system will indicate the use of OnTrac CalTrac over OnTrac Gold (which is the preferred carrier for 98007) because the former business rule is listed earlier in the list. In various embodiments, this order may create one or more default business rules that are applied when no other, higher-ranked, rules are satisfied.

Figure 8:
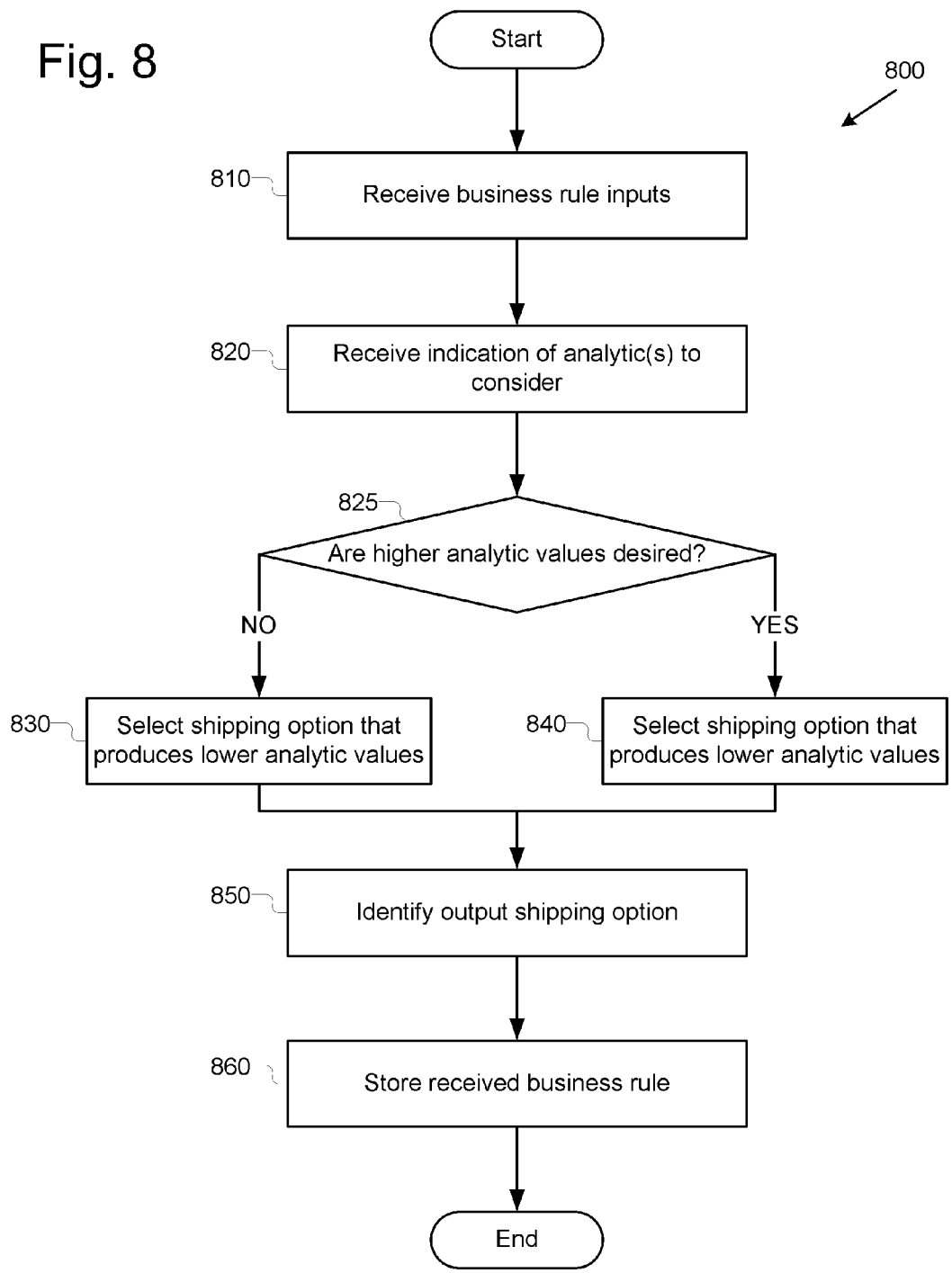
FIG. 8 illustrates a process for generating a business rule.

FIG. 8 illustrates an example process 800 for the business rules generation module 140 of the package shipment facilitation system 100 to automatically generate a business rule. In some embodiments, process 800 may be performed in one or more implementations of operation 230 of FIG. 2 to automatically generate business rules for a user or business, rather than relying on the user to manually create the rules. The process may begin at operation 810, where the business rules generation module 140 may receive business rule inputs. In various embodiments, business rule inputs may comprise, for example, destination information, package information, time frame requirements, and/or other package information. At operation 820, the business rules generation module 140 may receive one or more indications of one or more analytics to consider. In various embodiments the business rules generation module 140 seeks values for analytics which are more desired by a user.

In various embodiments, the analytics may be preferred by a user (or the user's business) to be higher or lower depending on the type of analytic being considered. Thus, in some embodiments, the business rules generation module 140 may operate to increase those analytics for which a higher value is desired by a user or business, such as on-time percentage. In other embodiments, the business rules generation module 140 may operate to decrease those analytics for which a lower value is desired by the user or business, such as cost or distance travelled. In various embodiments, at operation 820, the business rules generation module 140 may receive one or more indications of whether higher or lower values are desired for the one or more received analytics. In other embodiments, the business rules generation module 140 may be configured to recognize one or more of the analytics and to recognize, for those analytics, whether higher or lower values are desired.

At operation 825, the business rules generation module 140 determines, for an analytic, if a higher value is desired by a user or business. If not, then at operation 830 the business rules generation module 140 may seek out and set a shipping option for the business rule being generated which produces lower values for that analytic than other shipping options. If, however, a higher value is desired, at operation 840 the business rules generation module 140 may seek out and set a shipping option for the business rule being generated which produces higher values. In various embodiments, the business rules generation module 140 may seek out a shipping option by simulating shipping using one or more of the business rule inputs based on the historic analytical data stored in analytic history storage 150. In various embodiments, various shipping options may be simulated and compared to each other to perform the selection of operations 830 and 840. Then, at operation 850, the business rules generation module 140 identifies the output shipping option which, in simulation, produced the most desired analytic outcome. At operation 860, the business rules generation module 140 may store the generated business rule. In one embodiment, the business rules generation module 140 may store the generated business rule by storing the rule in a business rules database in the business rules storage 160. The process may then end.

Figure 9:
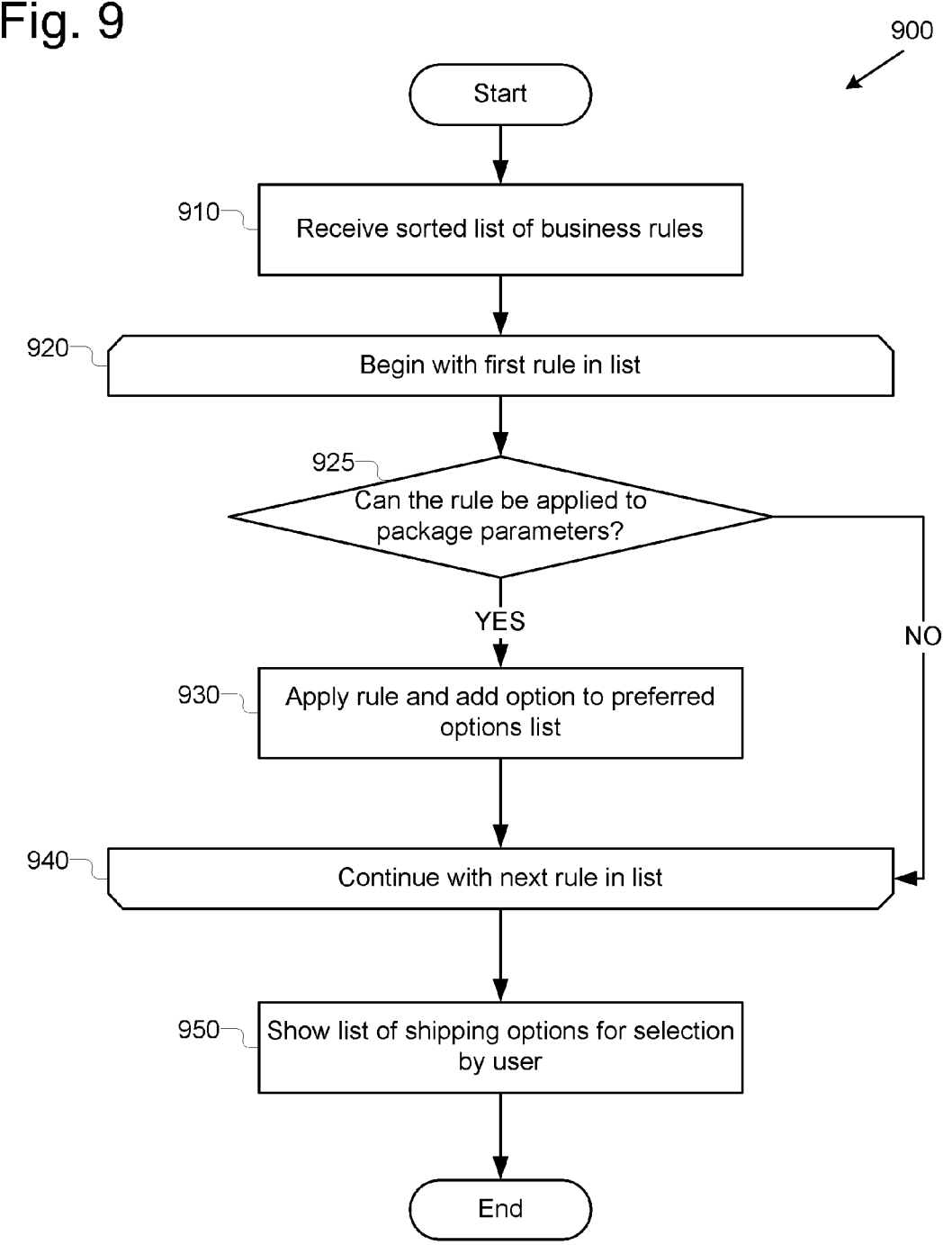
FIG. 9 illustrates a process for applying business rules to package parameters to identify preferred shipping options.

FIG. 9 illustrates an example process 900 for the business rules application module 130 of the package shipment facilitation system 100 to apply generated business rules for a package. In some embodiments, process 900 may be performed in one or more implementations of operation 240 of FIG. 2. The process may begin at operation 910, where the business rules application module 130 module may receive a sorted list of business rules. In one embodiment, the business rules application module 130 may receive this list by querying the business rules storage 160. In some embodiments, the list may not be sorted. In some such embodiments, the user may be queried to resolve conflicts amongst rules.

At operation 920, a loop may be begun starting with the first rule in the list. At operation 925, the business rules application module 130 may determine if the currently-considered rule can be applied to the parameters received for the package. In one embodiment, these parameters are received at operation 220 of FIG. 2. In various embodiments, the business rules application module 130 may determine if the rule can be applied by matching the business rule inputs identified in the rule to the parameters for the package being shipped. If the rule applies, then at operation 930, the rule may be applied and the output shipping options are added to a list of preferred options for the user. In one embodiment, not illustrated, once a rule is applied, the process may stop and the shipping option may be presented to the user. However, in alternative embodiments, such as the one illustrated, at operation 940, the loop may be continued for the next business rule in the sorted list.

Then, at operation 950, the list created by successive applications of operation 930 may be shown to the user 105. The user may then select a shipping option and may start shipment of the package, such as at operation 250. The process of FIG. 9 may then end.

Figure 10:
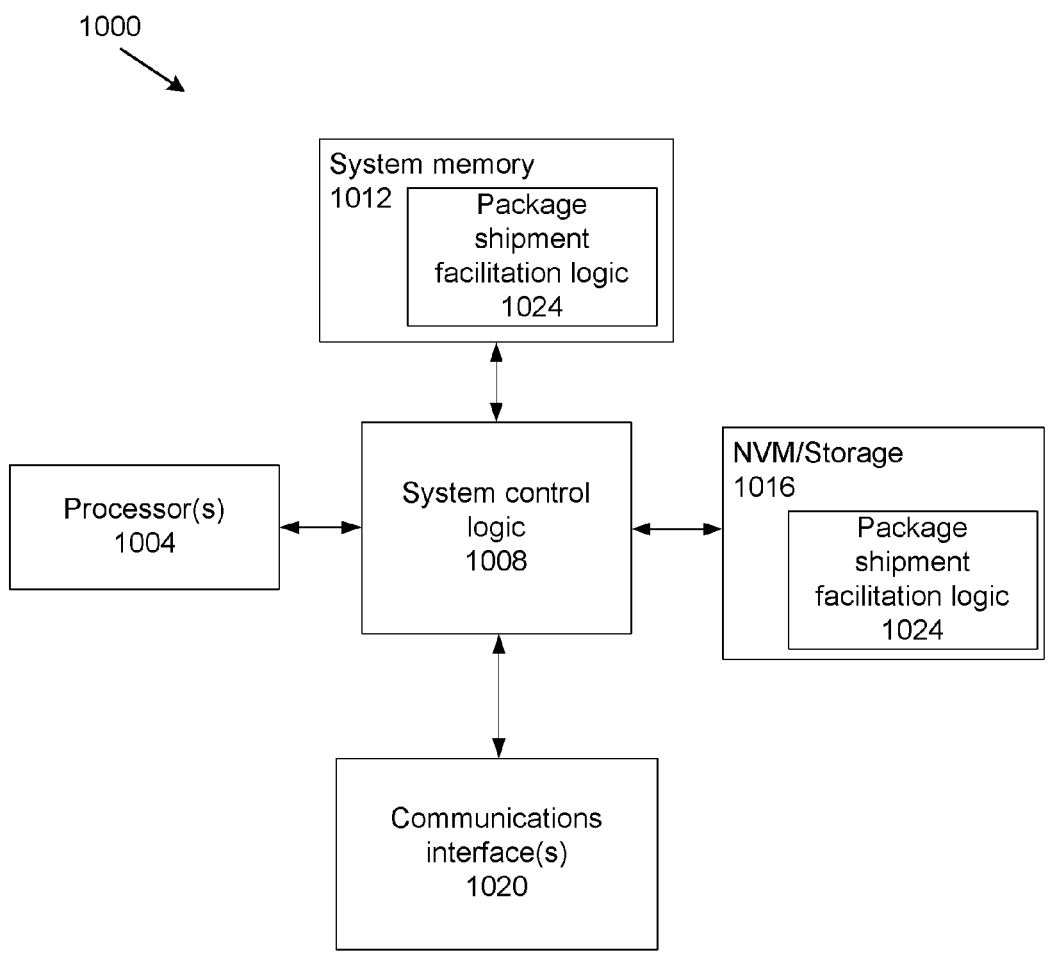
FIG. 10 illustrates an example computing device configured to practice various aspects of the earlier described methods, all ranged in accordance with various embodiments of the present disclosure.

The techniques and apparatuses described herein may be implemented into a system using suitable hardware and/or software to configure as desired. FIG. 10 illustrates, for one embodiment, an example system 1000 comprising one or more processor(s) 1004, system control logic 1008 coupled to at least one of the processor(s) 1004, system memory 1012 coupled to system control logic 1008, non-volatile memory (NVM)/storage 1016 coupled to system control logic 1008, and one or more communications interface(s) 1020 coupled to system control logic 1008.

System control logic 1008 for one embodiment may include any suitable interface controllers to provide for any suitable interface to at least one of the processor(s) 1004 and/or to any suitable device or component in communication with system control logic 1008.

System control logic 1008 for one embodiment may include one or more memory controller(s) to provide an interface to system memory 1012. System memory 1012 may be used to load and store data and/or instructions, for example, for system 1000. System memory 1012 for one embodiment may include any suitable volatile memory, such as suitable dynamic random access memory (DRAM), for example.

System control logic 1008 for one embodiment may include one or more input/output (I/O) controller(s) to provide an interface to NVM/storage 1016 and communications interface(s) 1020.

NVM/storage 1016 may be used to store data and/or instructions, for example. NVM/storage 1016 may include any suitable non-volatile memory and/or non-transitory computer-readable media, such as flash memory, for example, and/or may include any suitable non-volatile storage device(s), such as one or more hard disk drive(s) (HDD(s)), one or more solid-state drive(s), one or more compact disc (CD) drive(s), and/or one or more digital versatile disc (DVD) drive(s) for example.

The NVM/storage 1016 may include a storage resource physically part of a device on which the system 1000 is installed or it may be accessible by, but not necessarily a part of, the device. For example, the NVM/storage 1016 may be accessed over a network via the communications interface(s) 1020.

System memory 1012 and NVM/storage 1016 may include, in particular, temporal and persistent copies of logic 1024. Logic 1024 may be configured to enable system 1000, in response to operation of the logic, to practice some or all aspects of the package shipment facilitation techniques described earlier. In various embodiments, logic 1024 may be implemented via programming instructions of any one of a number of programming languages, including but not limited to C, C++, C#, HTML, XML, and so forth.

Communications interface(s) 1020 may provide an interface for system 1000 to communicate over one or more network(s) and/or with any other suitable device. Communications interface(s) 1020 may include any suitable hardware and/or firmware. Communications interface(s) 1020 for one embodiment may include, for example, a network adapter, a wireless network adapter, a telephone modem, and/or a wireless modem. For wireless communications, communications interface(s) 1020 for one embodiment may use one or more antenna(s).

For one embodiment, at least one of the processor(s) 1004 may be packaged together with logic for one or more controller(s) of system control logic 1008. For one embodiment, at least one of the processor(s) 1004 may be packaged together with logic for one or more controllers of system control logic 1008 to form a System in Package (SiP). For one embodiment, at least one of the processor(s) 1004 may be integrated on the same die with logic for one or more controller(s) of system control logic 1008. For one embodiment, at least one of the processor(s) 1004 may be integrated on the same die with logic for one or more controller(s) of system control logic 808 to form a System on Chip (SoC).

In various embodiments, system 1000 may have more or fewer components, and/or different architectures.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the disclosure. Those with skill in the art will readily appreciate that embodiments of the disclosure may be implemented in a very wide variety of ways. This disclosure is intended to cover any adaptations or variations of the embodiments discussed herein. Therefore, it is manifestly intended that embodiments of the disclosure be limited only by the claims and the equivalents thereof.

What is claimed is:

1. A computer-implemented method for facilitating shipment of a package, the method comprising:
    receiving, by a computing device, historical analytic data of one or more available shipping options from multiple users who have shipped packages via one or more carriers;
    receiving, at the computing device, identification of one or more business rule parameter inputs for a computer-generated business rule;
    automatically identifying, by the computing device, an output shipping option for the computer-generated business rule;
    storing, by the computing device, the computer-generated business rule, including the identified output shipping option, such that the stored computer-generated business rule may be applied to received parameters for shipment of packages to identify the stored output shipping option as a preferred shipping option;
    receiving, by the computing device, one or more parameters for shipment of the package; and
    based at least in part on application of one or more stored business rules using the historical analytical data to the one or more parameters, the one or more business rules including the stored computer-generated business rule, identifying, at the computing device, one or more preferred shipping options out of the one or more available shipping options.

2. The method of claim 1, wherein:
    the one or more business rules further comprise a user-defined business rule and;
    the method further comprises:
        receiving, at the computing device, identification of one or more business rule parameter inputs for the user-defined business rule; and
        receiving, at the computing device, an output shipping option for the user-defined business rule.

3. The method of claim 1, wherein:
    automatically identifying an output shipping option comprises automatically identifying, by the computing device, an output shipping option which, when used with the one or more business rule parameter inputs, results in higher values for one or more first types of the historical analytic data as compared to other shipping options; and
    the first types of the historical analytic data are types for which a user has identified that higher values are desired.

4. The method of claim 1, wherein:
    automatically identifying an output shipping option comprises automatically identifying, by the computing device, an output shipping option which, when used with the one or more business rule parameter inputs, results in lower values for one or more second types of the historical analytic data as compared to other shipping options; and
    the second types of the historical analytic data are types for which a user has identified that lower values are desired.

5. The method of claim 1, further comprising receiving, by the computing device, an identification of a default business rule.

6. The method of claim 1, wherein shipping options comprise shipping via the one or more carriers.

7. The method of claim 1, wherein shipping options comprise different modes of transportation for the packages being shipped.

8. The method of claim 1, wherein parameters comprise a destination address or a delivery time.

9. The method of claim 1, wherein receiving one or more parameters for shipment of the package comprises receiving the one or more parameters from an entity shipping the package; and
    wherein the method further comprises receiving, by the computing device, part of the historical analytic data from the entity shipping the package.

10. The method of claim 1, wherein historic analytic data comprises shipping price or surcharges.

11. The method of claim 1, further comprising printing, by the computing device, a shipping label for the package.

12. A system for facilitating shipment of a package, the system comprising:
    one or more computer processors;
    an analytic history storage coupled to the one or more computer processors, the analytic history storage configured to contain historical analytic data for one or more available shipping options, the historical analytic data comprising empirical data taken from multiple users who have shipped packages via one or more carriers;
    a business rules storage coupled to the one or more computer processors, wherein the business rules storage is configured to contain one or more business rules based on the historical analytic data in the analytic history storage, and the business rules are configured to identify one or more preferred shipping options out of the one or more available shipping options based on one or more shipping parameters;
    a business rules application module configured to control the one or more processors, in response to operation by the one or more processors, to:
        receive one or more parameters for shipment of the package; and
        apply the one or more business rules from the business rules storage to the one or more parameters to identify one or more preferred shipping options out of the one or more available shipping options; and
    a business rules generation module configured to control the one or more processors, in response to operation by the one or more processors, to:

generate the one or more business rules based on the historical analytic data in the analytic history storage, the business rules including respective output shipping options, and store the generated one or more business rules, including the output shipping options, such that the business rules application module may apply the stored one or more business rules to received parameters for shipment of packages to identify the stored output shipping options as preferred shipping options.

13. The system of claim 12, wherein historical analytic data comprises empirical data taken from an entity from whom the parameters were received.

14. An article of manufacture, comprising:
a non-transitory tangible computer-readable storage medium; and
a plurality of computer-executable instructions stored on the tangible computer-readable storage medium, wherein the computer-executable instructions, in response to execution by an apparatus, cause the apparatus to perform operations for facilitating shipment of a package, the operations including:

receiving one or more parameters for shipment of the package;

receiving one or more business rules based on historical analytic data comprising empirical data taken from multiple users who have shipped packages via one or more carriers;

generating one or more business rules based on the historical analytic data, the generated business rules including respective output shipping options;

storing the one or more generated business rules, including storing the generated output shipping options; and applying the one or more stored business rules to the one or more parameters to identify one or more preferred shipping options out of one or more available shipping options.

15. The article of claim 14, wherein historical analytic data comprises empirical data taken from an entity with whom the package is associated.

* * * * *